United States Patent
Hakura et al.

(10) Patent No.: US 8,310,482 B1
(45) Date of Patent: Nov. 13, 2012

(54) DISTRIBUTED CALCULATION OF PLANE EQUATIONS

(75) Inventors: Ziyad S. Hakura, Mountain View, CA (US); Emmett M. Kilgariff, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1016 days.

(21) Appl. No.: 12/326,051

(22) Filed: Dec. 1, 2008

(51) Int. Cl.
*G06T 17/00* (2006.01)

(52) U.S. Cl. .......................... 345/420; 345/502; 345/503

(58) Field of Classification Search .................. None
See application file for complete search history.

(56) References Cited

U.S. PATENT DOCUMENTS

| | | | | |
|---|---|---|---|---|
| 5,363,475 A | * | 11/1994 | Baker et al. | 345/422 |
| 5,488,692 A | * | 1/1996 | Karasick et al. | 345/420 |
| 6,407,736 B1 | * | 6/2002 | Regan | 345/422 |
| 6,611,264 B1 | * | 8/2003 | Regan | 345/422 |
| 6,621,495 B1 | * | 9/2003 | Cook et al. | 345/506 |
| 7,659,893 B1 | * | 2/2010 | Oberman et al. | 345/422 |
| 2002/0118202 A1 | * | 8/2002 | Baldwin | 345/530 |

OTHER PUBLICATIONS

Eggers, et al. "Simultaneous Multithreading: A Platform for Next-Generation Processors," IEEE Micro, vol. 17, No. 5, pp. 12-19, Sep./Oct. 1997.

* cited by examiner

*Primary Examiner* — Said Broome
(74) *Attorney, Agent, or Firm* — Patterson & Sheridan, LLP (57) ABSTRACT

A system for distributed of plane equation calculations. A work distribution unit is configured to receive a set of vertex data that includes meta data associated with each vertex in a modeled three-dimensional scene, to divide the set of vertex data into a plurality of batches of vertices, and to distribute the plurality of batches of vertices to one or more general processing clusters (GPCs). A processing cluster array includes the one or more (GPCs), where each GPC includes one or more shader-primitive-controller units (SPMs), and each SPM is configured to calculate plane equation coefficients for a subset of the vertices included in a batch of vertices. Advantageously, a distributed configuration of multiple plane equation calculation units decreases the size of the data bus that carries plane equation coefficients and increases overall processing throughput.

19 Claims, 7 Drawing Sheets

DISTRIBUTED CALCULATION OF PLANE EQUATIONS

BACKGROUND OF THE INVENTION

1. Field of the Invention

The present invention generally relates to computer hardware and more specifically to distributed calculation of plane equations.

2. Description of the Related Art

The processing power of a modern central processing unit (CPU) may be supplemented using a co-processor, such as a graphics processing unit (GPU). Oftentimes, the GPU is used as a co-processor configured to process graphics data to generate pixels that are displayed on a screen. Graphics data may include graphics primitives, such as points or lines. The components of the GPU that generate pixels are collectively known as a "graphics processing pipeline."

One of the steps implemented in the graphics processing pipeline involves determining which pixels on the screen fall within a triangle defined by three vertices. This step may be accomplished by first interpolating between the three vertices to define three edges of the triangle defined by the three vertices. Each edge can be described by a linear equation of the form $Ax+By+C=0$, where A, B, and C are coefficients in an x,y coordinate grid. The three edges can then be used to generate a plane equation in the form of $Fx+Gy+Hz+J=0$, where F, G, H, and J are coefficients in an x, y, z coordinate grid. Once these coefficients are known for each plane, a particular pixel with coordinates (x,y) may be determined to be inside or outside of a particular triangle.

The coefficients are used by one or more pixel shaders to colorize each pixel on the screen according to the attributes of the triangle, or triangles, that include the pixel. Prior art systems perform pixel shading with a group of processors known as "shading multiprocessors," or SMs.

Figure 3:
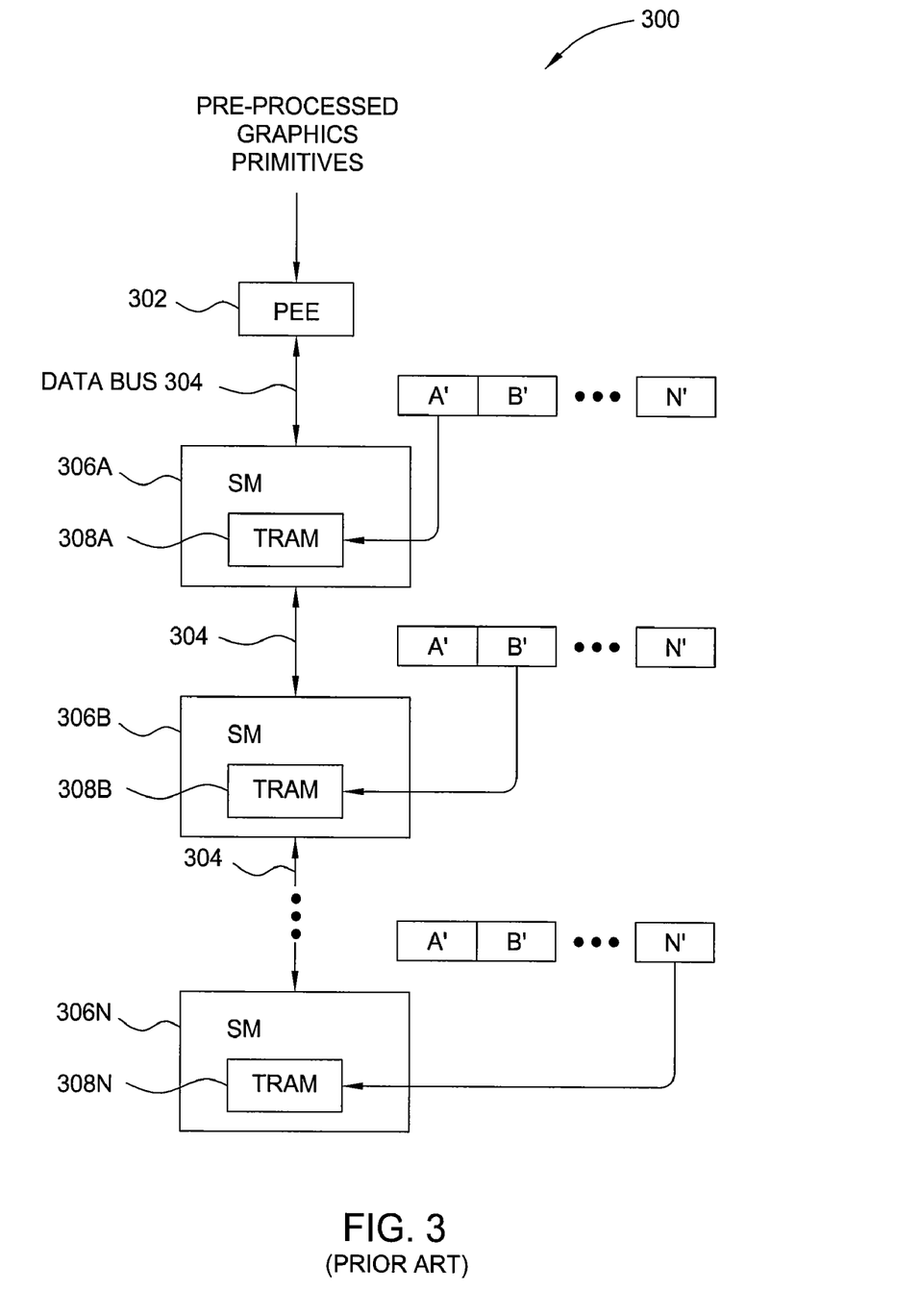
FIG. 3 is a block diagram of a graphics processing pipeline, according to the prior art.

A portion of the prior art graphics processing pipeline 300 is described in FIG. 3. As shown, preprocessed graphics primitives are passed to a primitive evaluation engine (PEE) 302 that calculates the plane equation coefficients for each triangle described by the vertex data and sends these coefficients via a data bus 304 to SMs 306A-306N, where the coefficients are stored in a local triangle RAM (tRAM) 308. The entire set of plane equation data A'-N' is sent along data bus 304 to each SM 306A-306N. Each SM receives the entire set of plane equation data A'-N' and performs further processing (e.g., pixel shading) on a portion of the total plane equation data A'-N'. For example, SM 306A performs further processing on data A', SM 306B performs further processing on data B', and SM 306N performs further processing on data N'.

One disadvantage of this configuration is that because all of the plane equation coefficients are transmitted together across data bus 304, the size of data bus 304 must be at least equal the total amount of data processed by the SMs 306A-306N at each clock cycle. For example, if ten SMs 306 each process 10 bytes of plane equation coefficients during each clock cycle, then data bus 304 would need to be 100 bytes wide to provide input data to each SM 306. Each SM 306 would copy the relevant 10 bytes from data bus 304 at each clock cycle. However, this configuration is not scalable because adding additional SMs 306 to improve graphics processing capabilities would require the bit width of the data bus to be increased to an impractical size.

Accordingly, there remains a need in the art for a more efficient and scalable way to calculate plane equations in a graphics processing pipeline.

SUMMARY OF THE INVENTION

Embodiments of the invention provide a system for distributed of plane equation calculations. A work distribution unit is configured to receive a set of vertex data that includes meta data associated with each vertex in a modeled three-dimensional scene, to divide the set of vertex data into a plurality of batches of vertices, and to distribute the plurality of batches of vertices to one or more general processing clusters (GPCs). A processing cluster array includes the one or more (GPCs), where each GPC includes one or more shader-primitive-controller units (SPMs), and each SPM is configured to calculate plane equation coefficients for a subset of the vertices included in a batch of vertices.

Advantageously, a distributed configuration of multiple plane equation calculation units decreases the size of the data bus that carries plane equation coefficients and increases overall processing throughput.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
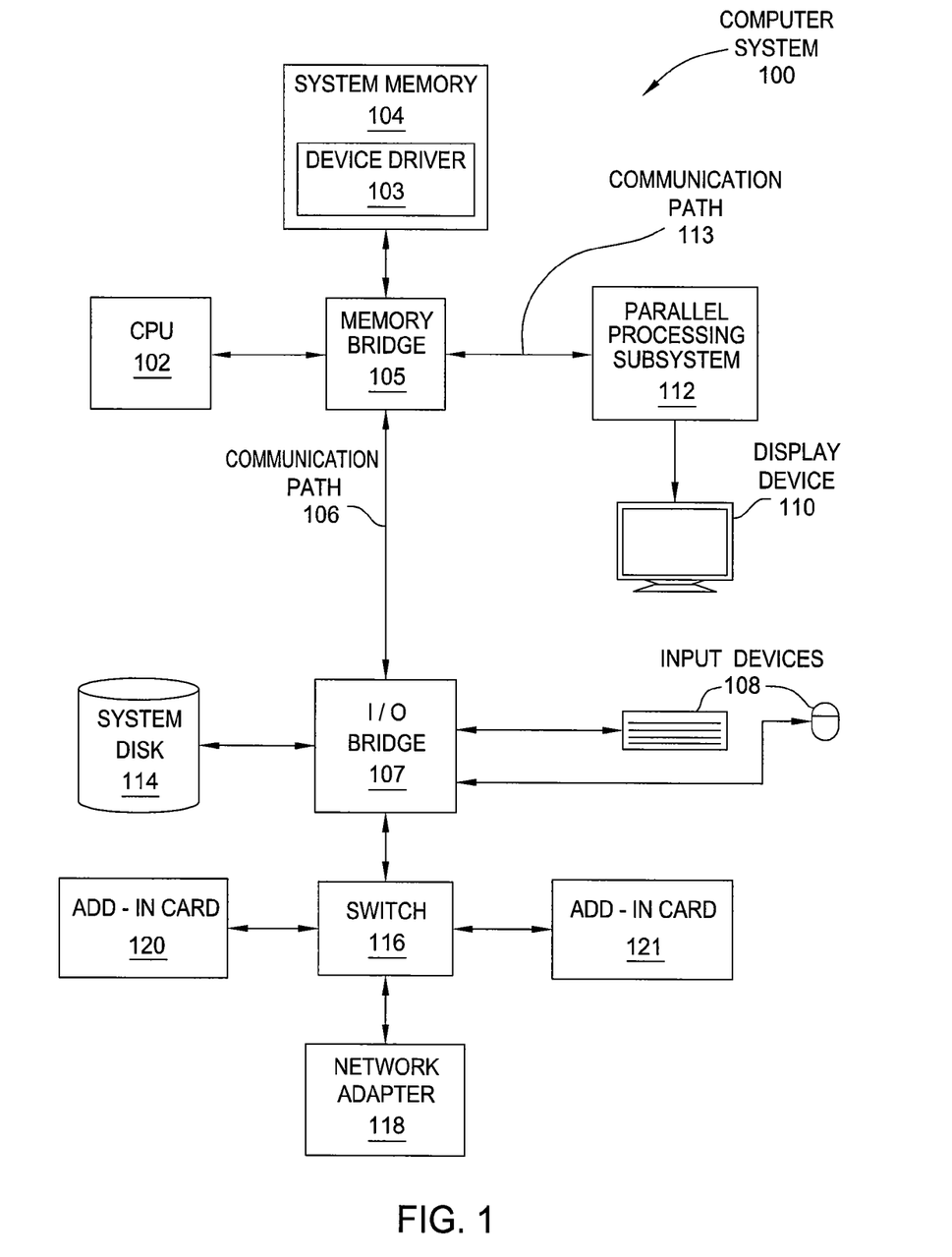
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path that may include a memory bridge 105. Memory bridge 105, which may be, e.g., a Northbridge chip, is connected via a bus or other communication path 106

(e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
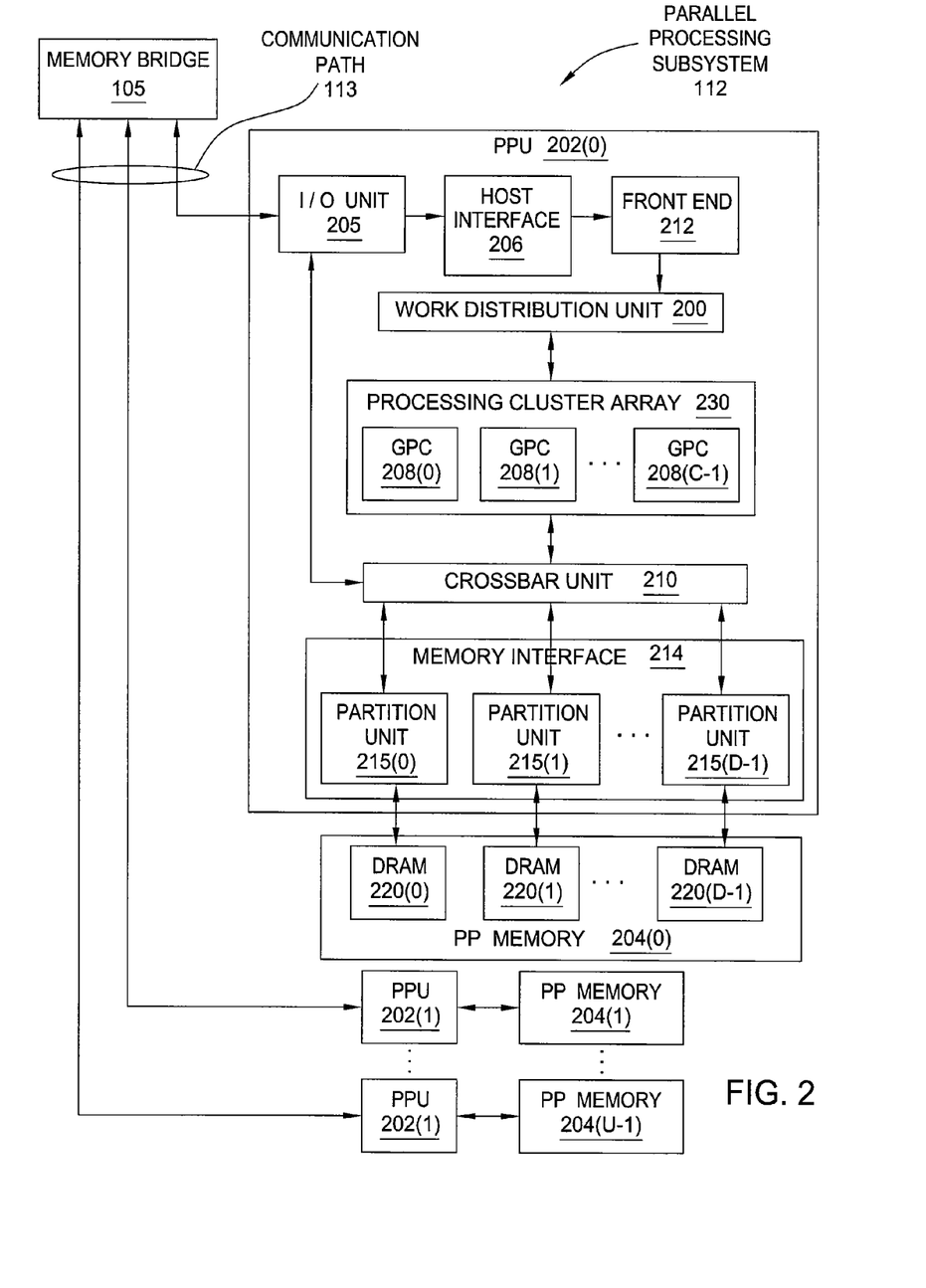
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-E link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where $D \geq 1$. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the partition units 215 within parallel processing memory 204. Crossbar unit 210 is configured to route the output of each GPC 208 to the input of any partition unit 214 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-E) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Figure 4:
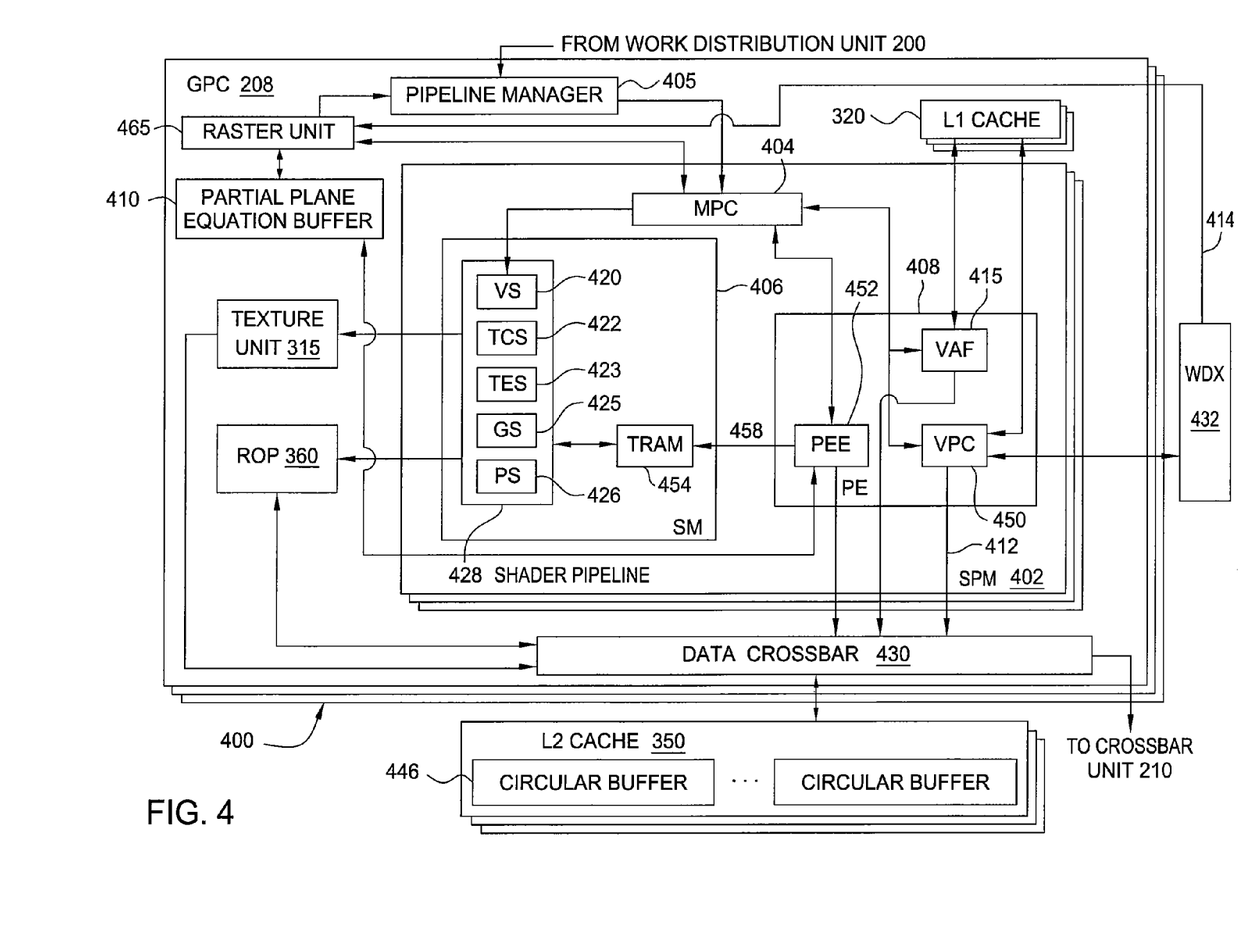
FIG. 4 is a block diagram of a distributed graphics processing pipeline, according to one embodiment of the present invention.

FIG. 4 is a block diagram of a distributed graphics processing pipeline (DGPP) 400, according to one embodiment of the present invention. DGPP 400 includes one or more general processing clusters (GPCs) 208, where each GPC 208 includes a plurality of ShaderMultiprocessor-PrimitiveEngine-MpipeControllers (SPMs) 402. Each SPM includes an Mpipe controller (MPC) 404, a shader multiprocessor (SM) 406, and a primitive engine (PE) 408.

Each SPM 402 on a GPC 208 is managed by a pipeline manager 305 that receives data from work distribution unit (WDU) 200. The received data may include graphics vertices separated into groups, hereinafter referred to as "batches." The pipeline manager 305 is configured to transmit a batch to each SPM 402 for processing. The batch assigned to SPM 402 is received by MPC 404, which manages the operation of both the SM 406 and the PE 408. The MPC 404 transmits the batch to the PE 408 for processing and halts operation of components within the SM 406 until some or all of the processing performed by the PE 408 is complete.

PE 408 includes a vertex attribute fetch engine (VAF) 415, a viewpoint culling engine (VPC) 450, and a primitive evaluation engine (PEE) 452. VAF 415 receives the batch from MPC 404 and fetches vertex attributes associated with the vertices in the batch. Vertex attributes may include color, position, or other attributes. VAF 415 temporarily stores the vertex attributes in an L1 cache 320 associated with SPM 402. VAF 415 then notifies MPC 404 that the vertex attributes are stored in L1 cache 320. In one embodiment, L1 cache 320 is replaced with a buffer or another type of memory unit.

MPC 404 then causes a shader pipeline 428 within SM 406 to execute enabled shaders. Shader pipeline 428 includes a plurality of shader units that may be enabled to process vertex data. Shader pipeline 428 includes a vertex shader (VS) 420, a tessellation control shader (TCS) 422, a tessellation evaluation shader (TES) 424, a geometry shader (GS) 425 and a pixel shader (PS) 426 that sequentially perform processing operations, as further described below. Once the sequential processing operations performed by the shaders within shader pipeline 428 are complete, SM 406 writes processed vertex data to L1 cache 320. MPC 404 then notifies VPC 450 that vertex data is ready for processing an stored in L1 cache 320. VPC 450 then reads the vertex data from L1 cache 320.

VPC 450 performs clipping, culling, perspective correction, and viewport scaling operations on processed vertex data. VPC 450 transmits processed vertex attributes along path 412 to data crossbar (x-bar) 430. data x-bar 430 is configured to distribute vertex attributes to circular buffers (CBs) 446 within L2 caches 350. Data x-bar 430 may transmit vertex attributes to any L2 cache on PP subsystem 112. VPC 450 then transmits pointers to the locations of the vertex attributes, referred to herein as circular buffer entry pointers, or "CBE pointers," to work distribution x-bar (WDX) 432.

VPC 450 is further configured to perform a bounding-box calculation with the graphics primitives to determine which region of the display each graphics primitive belongs to. This information is used to route each graphics primitive to one of a plurality of raster units, such as raster unit 465. Each raster unit rasterizes graphics primitives and fragments of graphics primitves that overlap a particular region of the display. Accordingly, WDX 432 transmits the graphics primitives associated with each region of the display to the raster unit that rasterizes that region of the display. WDX 432 also transmits the CBE pointers to the raster unit 465 along path 414. The CBE pointers to each vertex attribute are stored with the graphics primtive assocaited with that attribute.

Raster unit 465 receives the graphics primitives that overlap the region of the display belonging to the raster unit 465. Raster unit then associates the received graphics primitves with the pixels in that region to create a "tile." Raster unit 465 transmits the tile to the MPC 404. Raster unit 465 also generates partial plane equations based on the graphics primitives and stores these partial plane equations, and the associated CBE pointers, in a partial plane equation buffer (PPEB) 410. When one or more partial plane equations have been stored in PPEB 410, MPC 404 allows a primitive evaluation engine (PEE) 452 to access the PPEB 410.

PEE 452 retrieves the CBE pointers and partial plane equations from PPEB 410 according to instructions from MPC 404. PEE 452 then retrieves the vertex attributes corresponding to the graphics primitives in the tile from L2 cache 350 using the CBE pointers and solves for the coefficients of the plane equations using the retrieved vertex attributes. PEE 452 stores the resultant plane equation coefficients in a triangle RAM (tRAM) 454 within SM 406 along path 458. When a number of plane equation coefficients stored in tRAM 454 reaches a threshold amount, MPC 404 transmits the tile output by raster unit 465 to shader pipeline 428 included within SM 406.

VS 420 is a programmable execution unit that is configured to execute vertex shader programs on vertex data that may include lighting evaluation and transformations. For example, VS 420 may be programmed to transform the vertex data from an object-based coordinate representation (object space) to an alternatively based coordinate system such as world space or normalized device coordinates (NDC) space. VS 420 may read data that is stored in the L1 cache 320, PP memory 204, or system memory 104 when processing the vertex data. VS 420 transmits processed vertex data to TCS 422.

TCS 422 is a programmable execution unit that performs a change of basis of a control point, computation of tessellation LODs parameters, or the like, and is executed once for each surface patch described by the received vertex data. TCS 422 transmits processed vertex data to TES 424.

TES 424 is a programmable execution unit that computes a final position and attributes of each vertex based on patch primitive control points, parametric (u,v) position for each vertex, displacement maps, and the like, and is executed once for each output vertex. TES 424 transmits processed vertex data to GS 425.

GS 425 is a programmable execution unit that is configured to execute geometry shader programs on received vertex data. In some embodiments, GS 425 may also add or delete elements from the vertex data. GS 425 may read data that is stored in parallel processing memory 204 or system memory 104 when processing the geometry data. GS 425 transmits processed vertex data, e.g., graphics primitives, to PS 460.

PS 426 is a programmable execution unit that is configured to execute pixel shader programs using the plane equation coefficients stored in tRAM 454 and texture data stored in texture unit 315. PS 460 may also read data that is stored in PP memory 204 or system memory 104 via L2 cache 350. PS 426 may be programmed to perform operations such as perspective correction, texture mapping, shading, blending, and the like, to generate colorized pixels that are output to Raster Operations Unit (ROP) 360.

ROP 360 is a processing unit that performs raster operations, such as stencil, z test, and the like, and outputs pixel data as processed graphics data. In some embodiments of the present invention, ROP 360 is configured to compress z or color data that is written to memory and decompress z or color data that is read from memory. Processed graphics data output by ROP 360 may be routed through data x-bar 430 to parallel processing memory 204, and/or system memory 104, for display on display device 110 or for further processing by CPU 102 or parallel processing subsystem 112. Graphics data may also be stored in in L1 cache 320 for further processing.

Figure 5:
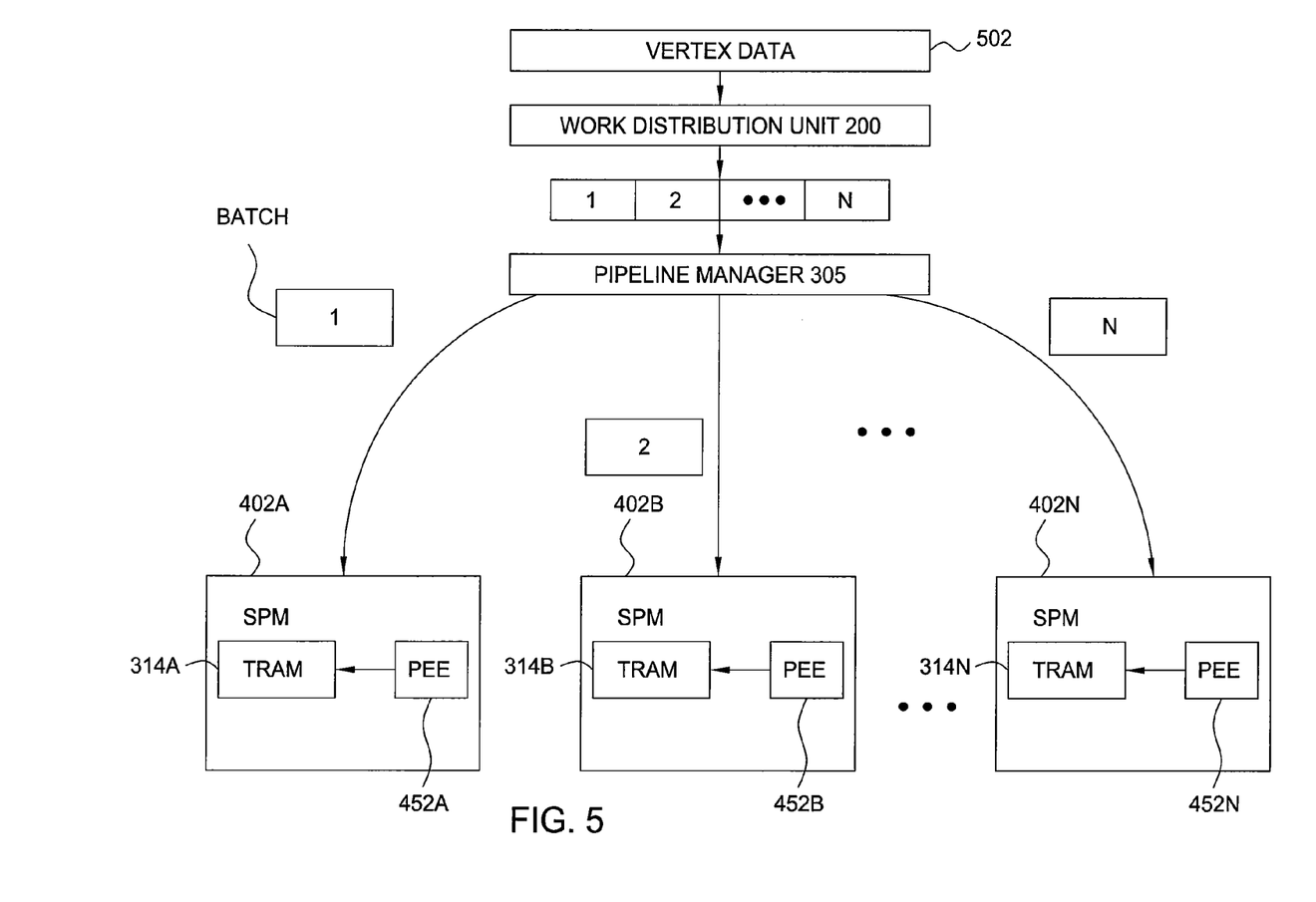
FIG. 5 is a conceptual diagram of a graphics data distribution technique, according to one embodiment of the present invention.

FIG. 5 is a conceptual diagram of a graphics data distribution process, according to one embodiment of the present invention. As shown, WDU 200 receives vertex data 502 and generates batches 1–N. Each batch 1–N may include vertices that are to be processed by SPMs 402A-402N and one or more raster units to generate tiles.

WDU 200 transmits batches 1–N to pipeline manager 305 which then distributes a different batch to each SPM 402A-402N for processing. Pipeline manager 305 is connected to each of SPMs 402A-402N via separate connections, where data transfers to one SPM 402A are carried out independent of data transfers to another SPM 402B. Pipeline manager 305 is capable of transmitting another batch to each SPM 402 whenever a particular SPM has finished processing the previous batch, regardless of the progress of any other SPM 402 with regards to batch processing. In one embodiment, pipeline manager 305 distributes the batches using a round-robin policy.

Each SPM 402 includes, among other things, a dedicated PEE 452 and tRAM 454, as described in FIG. 4. This configuration is better suited for data processing than the prior art system of FIG. 3 because each processing unit (SPMs 402A-402N) operates simultaneously and is not capable of impeding the processing of any other processing unit. In the system described in FIG. 1, a single SM 306A could flood the PEE 302 with requests to calculate plane equation coefficients and thus starve the other SMs 306B-306N of the shared PEE 302 resource.

Additionally, each SPM 402A-402N receives data to be processed through a dedicated bus that is sized to match the processing requirements of just one SPM 402. This configuration is highly scalable compared to the prior art system of FIG. 1 because adding new SPMs 402 only requires adding a new connection to pipeline manager 305. In contrast, adding additional SMs 306 to the graphics pipeline 300 of FIG. 3 requires the data bus 304 connecting each SM 306A-306N to be increased beyond the size actually required by one SM 306.

Figure 6:
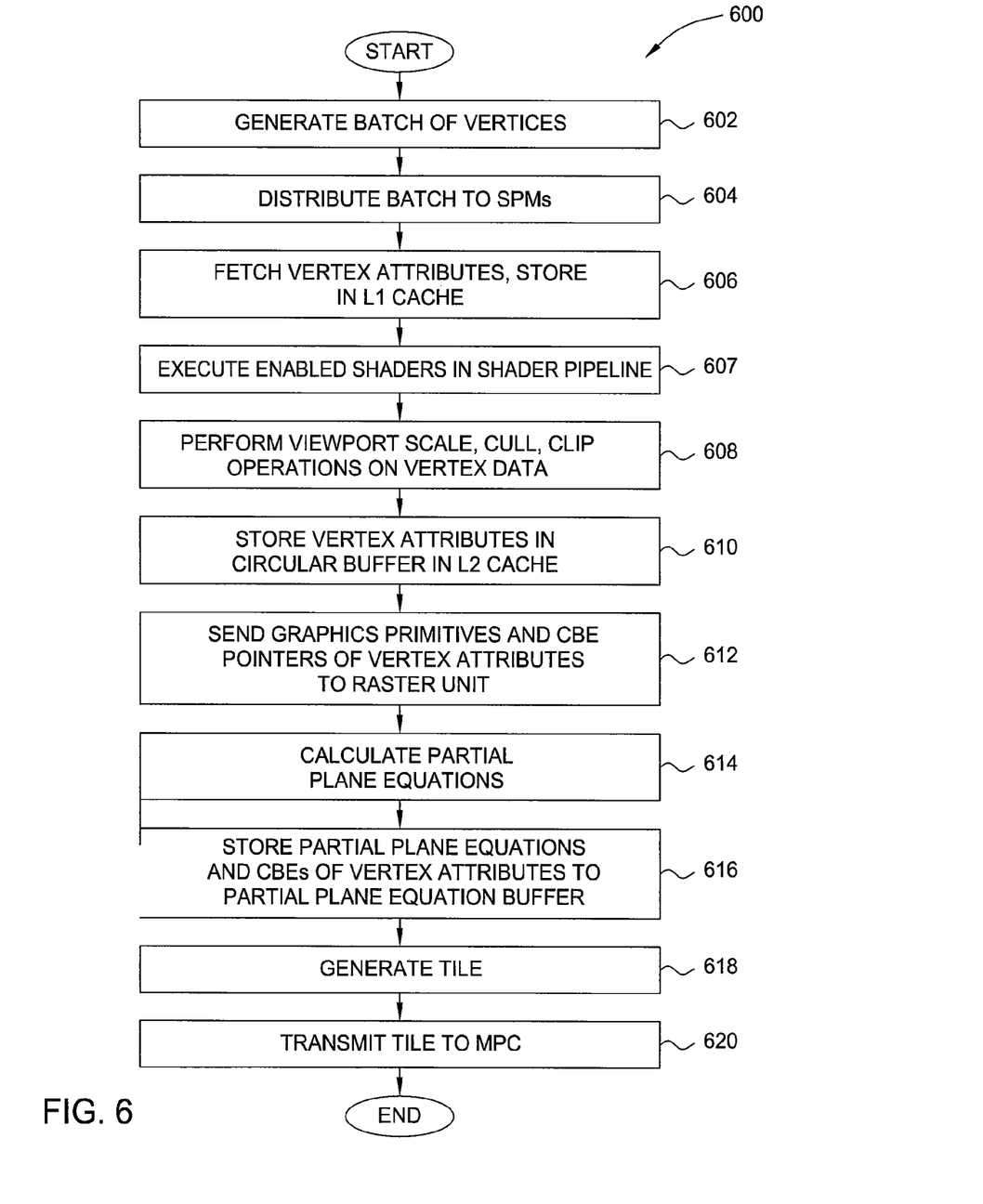
FIG. 6 is a flowchart of method steps for generating partial plane equations, according to one embodiment of the present invention.

FIG. 6 is a flowchart of method steps for generating partial plane equations, according to one embodiment of the present invention. Persons skilled in the art will understand that, even though the method 600 is described in conjunction with the systems of FIGS. 1-2 and 4-5, any system configured to perform the method steps, in any order, is within the scope of the present invention.

As shown, the method 600 begins at step 602, where WDU 200 receives vertex data 502 and generates a batch of vertices and transmits batches 1–N to pipeline manager 305.

At step 604, pipeline manager 305 distributes a single batch to SPM 402 for processing. MPC 404 within the SPM 402 receives the batch and transmits the batch to VAF 415.

At step 606, VAF 415 fetches the vertex attributes associated with the batch and stores the vertex attributes in L1 cache 320. The vertices within the batch and the fetched vertex attributes comprise "vertex data." At step 607, the shader pipeline 428 performs processing operations and stores the resulting vertex data in L1 cache 350. At step 608, VPC 450 accesses L1 cache 320 and retrieves vertex data. VPC 350 then performs viewport scaling, culling, and clipping operations on the vertex data.

At step 610, VPC 450 transmits vertex attributes from the processed vertex data to circular buffers 422 within L2 cache 350 along path 412. At step 612, VPC 450 transmits graphics primitives from the processed vertex data and CBE pointers associated with the stored vertex attributes to raster unit 465 along path 414.

At step 614, raster unit 465 calculates partial plane equations for the graphics primitives. At step 616, raster unit 465 stores the partial plane equations and the CBE pointers associated with the vertex attributes in PPEB 410.

At step 618, raster unit 465 generates a tile that includes the pixels belonging to a certain region of the display and the graphics primitives that overlap that region of the display. At step 620, raster unit 465 transmits the tile to the MPC 404.

Figure 7:
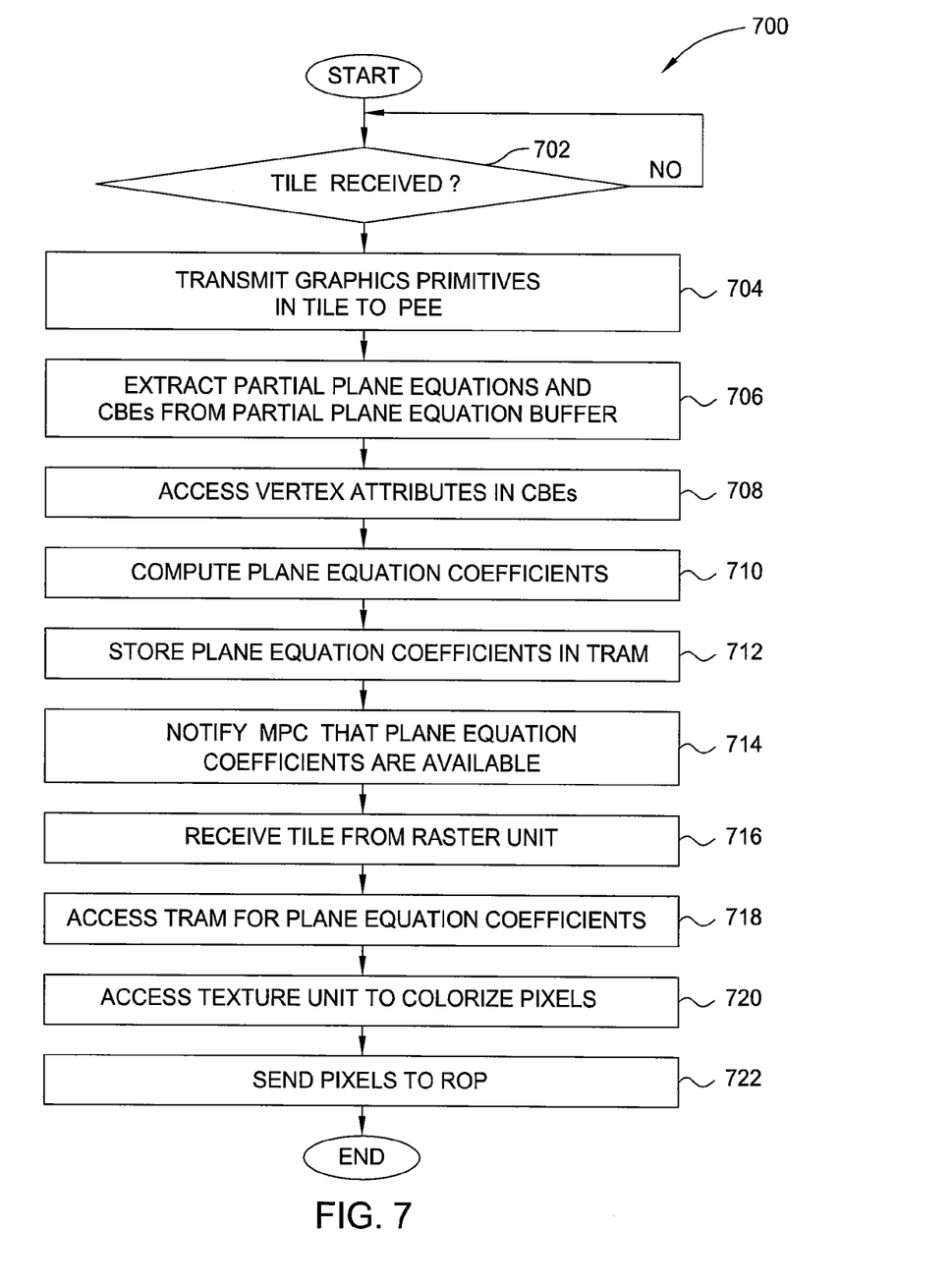
FIG. 7 is a flowchart of method steps for generating plane equation coefficients, according to one embodiment of the present invention.

FIG. 7 is a flowchart of method steps for generating plane equation coefficients, according to one embodiment of the present invention. Persons skilled in the art will understand that, even though the method 700 is described in conjunction with the systems of FIGS. 1-2 and 4-5, any system configured to perform the method steps, in any order, is within the scope of the present invention.

As shown, the method 700 begins at step 702, where MPC 404 determines whether a tile has been received. When a tile becomes available, at step 704, MPC 404 transmits the graphics primitives associated with that tile to the PEE 454. At step 706, MPC 404 allows PEE 452 to retrieve partial plane equations and CBE pointers from PPEB 410 that are associated with the graphics primitives in the received tile. At step 708, PEE 452 extracts the vertex attributes from CBs 422 via data x-bar 330 based on the CBE pointers. At step 710, PEE 452 computes plane equation coefficients based on the partial plane equations received from PPEB 410 and the vertex attributes retrieved from the CBs 422. At step 712, PEE 452 stores the plane equation coefficients in tRAM 454 along path 458. At step 714, PEE 452 notifies MPC 404 that plane equation coefficients for associated with a primitive are available.

When the plane equation coefficients are received into tRAM 454, then, at step 716, MPC 404 allows PS 426 to receive the tile and the associated pixel data from raster unit 465. At step 718, PS 426 accesses tRAM 454 and extracts the plane equation coefficients stored by PEE 452. At step 720, PS 426 accesses texture unit 315 to extract data, e.g., texture maps. Based on the plane equation coefficients and the data extracted from texture unit 315, PS 426 performs texture mapping, shading, and/or blending operations to colorize pixels. At step 722, the colorized pixels are transmitted to ROP 360 for raster operations, such as stencil or z-test. The processed pixels are output by ROP 360 to data x-bar 330 and stored in parallel processing memory 204 and/or system memory 104 for display on display device 110, or for further processing by CPU 102 or parallel processing subsystem 112.

In sum, vertex data is grouped into N batches for parallel processing by N graphics processing sub-units. Each graphics processing sub-unit is configured to generate M tiles that include the graphics primitives overlapping a particular region of the display. Each tile also includes the pixels associated with that region of the display. For each tile, plane equation coefficients are calculated for each triangle defined by the graphics primitives in the tile using a primitive evaluation engine (PEE), triangle connectivity information, and triangle attribute information. The resultant coefficients are stored in a triangle RAM (tRAM) dedicated to and accessible by the graphics processing sub-unit. These coefficients allow a pixel shader to colorize pixels for a portion of a display associated with the batch by applying the attributes associated with each triangle to the pixels that fall within those triangles.

Advantageously, each processing sub-unit has a dedicated PEE configured to calculate plane equation coefficients. This distributed configuration of multiple PEE units decreases the size of the data bus that carries plane equation coefficients and increases overall processing throughput. Additional processing units can also be added to further increase the graphics processing throughput without increasing the size of the data bus that interconnects the processing sub-units. The combination of distributed processing sub-units and dedicated PEE units provides the dual advantage of increasing system throughput and providing scalability, without requiring excessive overhead in terms processor real estate and power consumption.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored;

and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A system for distributed plane equation calculations, the system comprising:
    a work distribution unit configured to:
        receive a set of vertex data that includes meta data associated with each vertex in a modeled three-dimensional scene,
        divide the set of vertex data into a plurality of batches of vertices, and
        distribute the plurality of batches of vertices to one or more general processing clusters (GPCs); and
    a processing cluster array that includes the one or more GPCs, wherein each GPC includes one or more shader-primitive-controller units (SPMs), and each SPM is configured to calculate plane equation coefficients for a subset of primitives included in a batch of vertices.

2. The system according to claim 1, wherein each subset of primitives is associated with a different set of pixels corresponding to a different region of a display and comprises a tile.

3. The system according to claim 1, wherein each SPM includes a shader multiprocessor (SM), a primitive engine (PE), and a controller (MPC), and the MPC manages operation of the SM and the PE.

4. The system according to claim 3, wherein the PE includes a vertex attribute fetch engine (VAF), a viewport culling engine (VPC), and a primitive evaluation engine (PEE).

5. The system according to claim 4, wherein the SM includes a vertex shader, a pixel shader, a tessellation control shader, a tessellation evaluation shader, a geometry shader, a pixel shader, and a triangle memory.

6. The system according to claim 5, wherein each GPC further includes a pipeline manager configured to receive a first batch of vertices transmitted from the work distribution unit and to distribute the first batch of vertices to a first SPM included in the GPC.

7. The system according to claim 6, wherein the MPC is configured to receive the first batch of vertices and to transmit the first batch of vertices to the PE.

8. The system according to claim 7, wherein the VAF is configured to fetch vertex attributes associated with vertices included in the first batch of vertices.

9. The system according to claim 8, wherein the VPC is configured to:
    perform vertex clipping, vertex culling, and viewport scaling operations to generate graphics primitives associated with the first batch of vertices;
    transmit the graphics primitives to a data crossbar within the GPC, wherein the data crossbar is configured to:
        distribute vertex attributes associated with the graphics primitives to a first circular buffer (CB) included in a cache memory, and
        transmit, to a raster unit within the GPC, a pointer that is associated with the first CB; and
    transmit the graphics primitives to the raster unit through a work distribution crossbar (WDX).

10. The system according to claim 9, wherein the raster unit is configured to:
    receive the pointer from the WDX;
    generate partial plane equations based on the graphics primitives; and
    store the partial plane equations in a buffer memory.

11. The system according to claim 10, wherein the raster unit is further configured to associate the graphics primitives with pixels occupying a region of a display to generate a tile.

12. The system according to claim 11, wherein the PEE is configured to:
    retrieve the partial plane equations from the buffer memory;
    retrieve the pointer from the buffer memory;
    calculate the plane equation coefficients associated with the partial plane equations and the vertex attributes associated with the pointer; and
    store the plane equation coefficients in the triangle memory.

13. The system according to claim 12, wherein the pixel shader is configured to execute a pixel shader program based on the plane equation coefficients stored in the triangle memory.

14. A computing device for distributed plane equation calculations, comprising:
    a system memory; and
    a processing subsystem, including:
        a work distribution unit configured to:
            receive a set of vertex data that includes meta data associated with each vertex in a modeled three-dimensional scene,
            divide the set of vertex data into a plurality of batches of vertices, and
            distribute the plurality of batches of vertices to one or more general processing clusters (GPCs); and
        a processing cluster array that includes the one or more GPCs (GPCc), wherein each GPC includes one or more shader-prim itive-controller units (SPMs), and each SPM is configured to calculate plane equation coefficients for a subset of the vertices included in a batch of vertices;
        a processing subsystem memory; and
        a data crossbar configured to distribute data to one or more circular buffers (CBs) included in the processing subsystem memory.

15. The computing device according to claim 14, wherein each GPC comprises:
    a shader multiprocessor (SM) that includes a pixel shader and a triangle memory, wherein the pixel shader is configured to execute a pixel shader program based on plane equation coefficients stored in the triangle memory;
    a primitive engine (PE) that includes a vertex attribute fetch engine (VAF), a viewport culling engine (VPC), and a primitive evaluation engine (PEE);
    a controller (MPC) that manages operation of the SM and the PE; and
    a pipeline manager that receives a first batch of vertices transmitted from the work distribution unit and distributes the first batch of vertices to the MPC, which transmits the batch of vertices to the PE;
    a buffer memory; and
    a raster unit configured to:
        generate partial plane equations based on graphics primitives received from the PE and to store the partial plane equations in the buffer memory, and associate the graphics primitives with pixels occupying a region of a display to generate a tile.

16. A computing device according to claim 15, wherein the PE is configured to:
   fetch vertex attributes associated with vertices included in the first batch of vertices;
   perform vertex clipping, vertex culling, and viewport scaling operations to generate graphics primitives associated with the first batch of vertices;
   transmit the graphics primitives to the work distribution crossbar that is configured to transmit a pointer associated with a circular buffer to the raster unit that stores the pointer in the buffer memory; and
   transmit the graphics primitives to the raster unit.

17. The computing device according to claim 16, wherein the PEE is configured to:
   retrieve the partial plane equations from the buffer memory;
   retrieve the pointer from the buffer memory;
   retrieving the vertex attributes from the circular buffer associated with the pointer;
   calculate the plane equation coefficients associated with the partial plane equations; and
   store the plane equation coefficients in the triangle memory.

18. A method for distributed plane equation calculations, comprising:
   receiving a set of vertex data that includes meta data associated with each vertex in a modeled three-dimensional scene;
   dividing the set of vertex data into a plurality of batches of vertices;
   distributing the plurality of batches of vertices to one or more general processing clusters (GPCs), wherein each GPC includes one or more shader-primitive-controller units (SPMs); and
   calculating, within the GPCs, plane equation coefficients for a subset of the vertices included in the batch of vertices.

19. The method according to claim 18, wherein each subset of vertices is associated with a different set of pixels corresponding to a different region of a display.

* * * * *